May 22, 1945.  G. H. GILL  2,376,683
ENGINE SYSTEM COOLING CONTROL
Filed Sept. 16, 1942
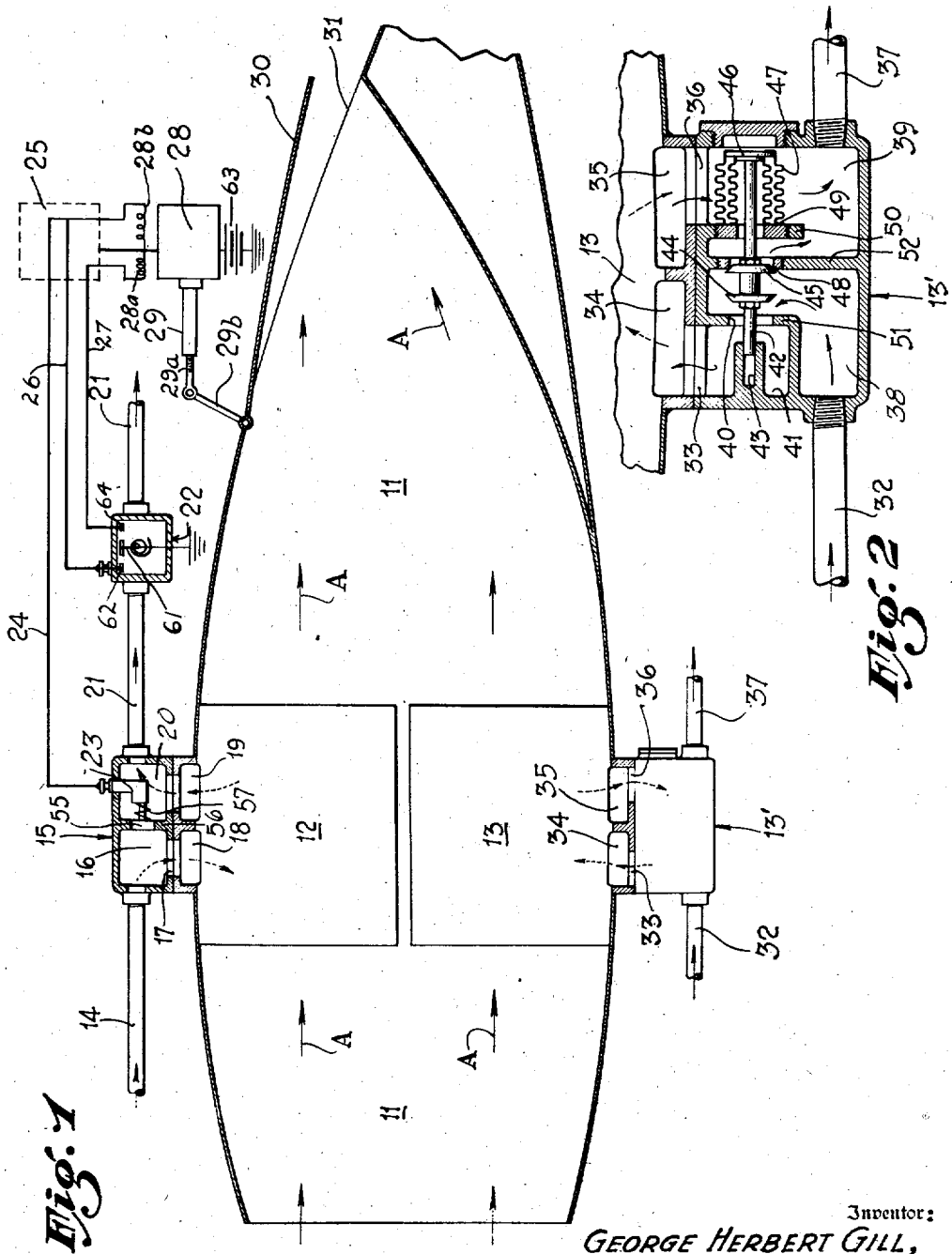
Inventor:
GEORGE HERBERT GILL,
By
Attorney.

Patented May 22, 1945

2,376,683

UNITED STATES PATENT OFFICE

2,376,683
ENGINE SYSTEM COOLING CONTROL

George Herbert Gill, Los Angeles, Calif., assignor to The Garrett Corporation, Airesearch Manufacturing Company division, Los Angeles Calif., a corporation of California Application September 16, 1942, Serial No. 458,522

8 Claims. (Cl. 123—174)

This invention relates to an improvement in dual cooling systems for an internal combustion engine wherein external cooling of the engine is effected by circulation of a cooling liquid through the engine jackets and internal cooling is accomplished by bringing cooled oil into contact with the engine's working parts. The invention is of especial utility in the cooling of aircraft engines.

It is one object of this invention to provide a dual cooling system for an internal combustion engine of the character above described embracing simplicity of design and economy of manufacture and in which both the oil cooler and the jacket liquid are disposed in a common air duct, through which the flow of air is controlled by a single flap or other air valve means.

There are many factors involved in determining the temperature of the lubricating oil and the liquid jacket cooling agent employed in the engine jackets, which cooling agent is generally an alcohol or aqueous solution containing a component to lower the freezing point of the liquid. But, the more important factors, such as horsepower developed by the engine, speed of the engine, and temperature, density and relative velocity of the atmospheric air affect both the temperature of the lubricating oil and of the jacket cooling agent.

It is an object of this invention to provide a dual cooling system of the character described, in which a common flow of refrigerant air is utilized for both coolers, the coolers being so arranged and associated that the regulation of the refrigerant air flow is under the control of the temperature of the oil.

It is another object of this invention to provide a dual cooling system of the character described and comprising both an oil and jacket cooling agent cooler mounted in a common air flow duct, through which air passes under control of the temperature of the oil leaving the oil cooler, in which the agent cooler has, as compared to the oil cooler, a small but sufficient reserve capacity so that there will be in the agent cooler an existing ability to over-cool the agent, and a simple supplementary control is provided to compensate for over-cooling of the agent, this supplementary control comprising a valved bypassage under the control of the thermostat responsive to the temperature of the liquid cooling agent leaving the agent cooler to bypass a required amount of the heated liquid cooling agent.

The liquid cooling agent ordinarily employed in the practice of the invention is known as Prestone and such identification is employed interchangeably herein with the term "cooling agent" and includes the same.

As is well understood by those experienced in the art of oil coolers for aircraft use, the oil congeals within the cooler upon the air tubes under certain operative conditions, requiring the complete or nearly complete shut off of the flow of refrigerant air through the cooler until the hot oil from the engine has had opportunity to be passed through the cooler in such a manner as to thaw the congealed oil. During the thaw-out period, the correlation factor between oil temperature values and the position of the flap or other air valve means in correspondence with any given sort of engine and aircraft operative conditions, is temporarily eliminated. As a result, the temperature of the cooling agent leaving the agent cooler will rise unduly high during the thaw-out period. To meet this difficulty, it is another object of the invention to provide a dual cooling system of the character described and having a common refrigerant air duct and air flow control therefor, in which the area of the heat exchange surfaces of the agent cooler shall be great enough to provide the agent cooler with a cooling capacity which, under extreme conditions and with the air flap nearly closed, is adequate to hold the temperature of the liquid leaving the agent cooler at a satisfactory normal value.

Other objects and advantages of the invention will appear in the following part of the description, from the drawing, and from the appended claims.

Referring to the drawing, which is for illustrative purposes only,

Fig. 1 is a schematic showing of a dual cooling system embodying this invention.

Fig. 2 is a sectional view of the regulator fitting of the agent cooler.

In the drawing 11 represents an air duct which may be provided at any suitable location about the aircraft, and is often arranged chordwise of one of the wing structures. The forward end of the duct 11 is open and the rearward end 31 is closable by a flap 30.

A lubricating oil cooler 12 and a liquid cooling agent cooler 13 are mounted within the air duct, both of which coolers are of the type well known in the art pertaining to radiators and are provided with the usual air tubes (not shown) which are disposed within the cooler chambers to have refrigerant air passed therethrough in consequence of the motion of the aircraft through the atmosphere or the action of the aircraft propellers or other means causing a flow of air through the air duct 11. Hereafter the liquid cooling agent will be referred to simply as the agent or cooling agent.

As customary in oil cooler practice, lubricating oil enters the oil cooler 12 from a hot oil delivery piping 14 leading from the engine, through an inlet chamber 16 of a cooler protective and control fitting 15 and through an inlet chamber 18 in the cooler. Oil leaves the cooler through the cooler outlet chamber 19 and the outlet chamber 20 of the fitting 15 to enter the cooled oil return piping 21.

The numeral 22 represents schematically a thermostatic control having a conventional thermo-sensitive switch arm 61 therein adapted, upon a reduction of oil temperature below normal, to engage a contact 62 so as to establish, through the conductor 26 and the coil 28b of the reversible motor 28, a circuit which is adapted to operate the motor 28 in a direction to close the flap 30. The connections between the motor 28 and the flap 30 include a sleeve 29 in threaded engagement with a threaded rod 29a which is pivoted to an arm 29b attached to the flap 30. The motor 28 may be energized by any suitable source of current which is indicated, for illustrative purposes, as a battery 63. Upon a rise in oil temperature above normal, the switch arm 61 is adapted to engage a contact 64 to establish, through a conductor 27 and the coil 28a of the motor 28, a circuit for operating the motor in a direction to open the flap 30.

To ensure closing of the flap 30 when the cooler 12 is filled with cold viscous oil and especially to care for the congealing of oil upon the air tubes of the cooler 12, a control device 23 within the fitting 15 which is responsive to the pressure drop between the inlet chamber 16 and outlet chamber 20, to establish a circuit through the conductor 27 and the coil 28b of the motor 28 to override the action of the thermostatic control device 22 and operate the motor 28 to close the shutter 30 irrespective of the temperature of the oil leaving the cooler or of the response of the thermostatic control device 22 to that temperature. The device 23 has a piston or diaphragm 55 disposed in an opening in the partition wall 56 between the inlet chamber 16 and the outlet chamber 20, and a spring 57 which resists rightward movement of the member 55. When oil thickens within the cooler 12, the increase in pressure differential between the chambers 16 and 20 will cause the member 55 to move rightward against the action of the spring 57, thereby actuating the pressure-override device 23.

The connection to the motor 28 may be carried through a conventional junction box, indicated schematically in broken lines at 25. Thermostatic electric control systems embodying a pressure override and a shutter operating, reversible motor powered screw jack, are known in the art, as shown, for example, by the patent to Hannon, No. 2,314,937, issued March 30, 1943, on an application filed February 14, 1942. An agent cooler 13 of the type well known to the radiator art, similarly provided with air tubes through which air flow of the duct 11 is passed, receives the cooling agent from the hot cooling agent delivery piping 32 leading from the engine, through a control fitting 13' from which the cooling agent passes to an inlet chamber 34 of the agent cooler to the cooler core. The cooling agent from the agent cooler core passes through a cooler outlet chamber 35 into the control fitting 13' from which it is withdrawn through a cooled cooling agent withdrawal piping 37 and supplied to the engine liquid cooling jacket.

The fitting 13' is formed with inlet chambers 38 and 41 separated by a partition wall 51 of the fitting in which is formed a port opening and valve seat 40. The inlet chamber 41 communicates with the inlet chamber 34 of the agent cooler by means of an opening 33 in the walls of the fitting 13'.

The fitting 13' is also provided with an outlet chamber 39 which receives the cooling agent from the cooler through an opening port 36 registering with the cooler outlet chamber 35 and which discharges the cooling agent into the cooled liquid withdrawal piping 37.

A valve stem 42, upon which are mounted oppositely facing valve elements 44 and 45, is guided in its longitudinal movement by a socket 43 formed in an interior lug on one of the walls of the fitting 13'. Valve element 44 in the inlet chamber 38 engages valve seat 40. Valve element 45 also in the inlet chamber 38 engages a valve seat 48 formed in a port opening in the partition wall 52 of the fitting 13' which separates the inlet chamber 38 from the outlet chamber 39.

The end of valve stem 42 which lies in outlet chamber 39 has secured to it the live end of a thermostat 47, the dead end 49 of which is mounted in a supporting wall 50 carried by the fitting 13'.

The area of the air tubes of the agent cooler 13 is of sufficient extent to provide the cooler with a capacity to cool to normal temperature the maximum liquid stream flow from the engine cooling jacket at maximum atmospheric temperatures and at the low air stream speeds within the duct which exists when the shutters are in extreme closed position. As a result of this feature of design of the agent cooler, when the flap 30 is entirely closed by the action of the oil cooler pressure drop control to thaw out congealed oil in the oil cooler, the agent cooler will have sufficient cooling capacity to prevent an undue rise in temperature of the cooling agent liquid returning to the engine, even though the temperature of the atmospheric air is excessively high. It will be observed that due to the presence of hot oil and hot cooling agent in the coolers, the temperature of the air within the air duct 11 may, when the air flap 30 is closed, be somewhat higher than that of the atmospheric air without the cooler. Looking at it from a somewhat different standpoint, the heat exchange walls of the liquid cooler must be so designed as to heat transference capacity that when the air flap is in open position the liquid cooler will cool to normal temperature under maximum atmospheric temperature conditions and at minimum aircraft speed relative to the atmosphere, a stream greatly in excess of the stream of liquid coming from the engine jacket at maximum engine speed.

From the foregoing description, the performance characteristics of the dual cooling system are apparent. Under ordinary operative conditions, the thermostatic regulator 22 maintains the temperature of the oil leaving the oil cooler 12 at proper temperature for return to the engine in a satisfactory manner. This temperature regulation accomplishes adjustment of the flap 30 in correspondence with the oil and air variables. Adjustment of the position of the flap 30 by the thermostatic regulator 22 also maintains the temperature of the cooling agent leaving the agent cooler at a temperature which is roughly the proper temperature for return to the engine cooling jacket. The thermostatically controlled valves 44 and 45 give further refinement to the regulation of the agent cooler 13 with the result that the temperature of the cooling agent in the return piping 37 is held satisfactorily at a normal operative value.

When the flap 30 is completely closed by action of the pressure drop control in the fitting 15 of the oil cooler 12, the temperature of the cooling agent in the return piping 37 is prevented from rising to an excessive value by reason of the oversized heat transfer surfaces of the agent cooler 13, through which all or most of the cooling agent may then be passed as a result of the closing of the valve 45 and opening of the valve 44 by the thermostat 47 under those conditions.

I claim as my invention:

1. In a liquid cooling system for an internal combustion engine having an oil circulating system and a cooling agent circulating system, the combination of: an oil cooler connected between the hot lubricating oil delivery piping and the cooled oil return piping of the oil circulating system of the engine; a liquid cooler connected between the hot cooling jacket liquid delivery piping and the cooled liquid return piping of the cooling agent circulating system of the engine; a common air stream means providing an air stream in heat exchange relation with both of said coolers; means regulating the flow rate of said air stream; a control means for said regulating means responsive to the temperature of the oil in said oil circulating system acting to increase the air flow rate in response to super-normal oil temperatures and to decrease the air flow rate in response to subnormal oil temperatures; a bypass passage means between the inlet and outlet of said liquid cooler; a valve for opening and closing said bypass passage; and a thermostat responsive to the temperature of the liquid treated by said liquid cooler for the operation of said valve acting to close said valve in response to super-normal liquid temperatures and to open said valve in response to subnormal liquid temperatures.

2. In a liquid cooling system for an internal combustion engine having an oil circulating system and a cooling agent circulating system, the combination of: an oil cooler connected between the hot lubricating oil delivery piping and the cooled oil return piping of the cooling agent circulating system of the engine; a liquid cooler connected between the hot cooling jacket liquid delivery piping and the cooled liquid return piping of the cooling agent circulating system of the engine; a common air stream means providing an air stream in heat exchange relation with both of said coolers; means regulating the flow rate of said air stream; a control means for said regulating means responsive to the temperature of the oil leaving said oil cooler acting to increase the air flow rate in response to super-normal oil temperatures and to decrease the air flow rate in response to subnormal oil temperatures; a bypass passage means between the inlet and outlet of said liquid cooler; a valve for opening and closing said bypass passage; and a thermostat responsive to the temperature of the liquid leaving said liquid cooler for the operation of said valve acting to close said valve in response to super-normal liquid temperatures and to open said valve in response to subnormal liquid temperatures.

3. In a liquid cooling system for an internal combustion engine having an oil circulating system and a cooling agent circulating system, the combination of: an oil cooler connected between the hot lubricating oil delivery piping and the cooled oil return piping of the oil circulating system of the engine; a liquid cooler connected between the hot cooling jacket liquid delivery piping and the cooled liquid return piping of the cooling agent circulating system of the engine; a common air stream means providing an air stream in heat exchange relation with both of said coolers; means regulating the flow rate of said air stream; a control means for said regulating means responsive to the temperature of the oil leaving said oil cooler acting to increase the air flow rate in response to super-normal oil temperatures and to decrease the air flow rate in response to subnormal oil temperatures; a supplementary control means for said regulating means effective in overriding relation to said first mentioned control means and in response to an excessive pressure drop between the inlet and outlet of said oil cooler to operate said regulating means to decrease the flow rate of said air stream; a bypass passage means between the inlet and outlet of said liquid cooler; a valve for opening and closing said bypass passage; and a thermostat responsive to the temperature of the liquid leaving said liquid cooler for the operation of said valve acting to close said valve in response to super-normal liquid temperatures and to open said valve in response to subnormal liquid temperatures.

4. The combination defined in claim 2 in which the heat exchange walls of said liquid cooler are so related as to area and to capacity of heat transference that said liquid cooler will cool to normal temperature the liquid stream from the engine cooling jacket at air temperatures appreciably higher than maximum atmospheric temperatures and at air stream speeds existing when the air stream regulating means is adjusted to minimum position.

5. The combination defined in claim 2 in which the heat exchange walls of said liquid cooler are so related as to area and to capacity of heat transference that said liquid cooler will cool to normal temperature at maximum atmospheric temperatures and at minimum aircraft speeds relative to the atmosphere, a stream in excess of the stream of liquid coming from the engine jacket, at maximum engine speed.

6. In a cooling system for an internal combustion engine having an oil circulating system and a cooling agent circulating system, the combination of: a duct through which a flow of cooling air may pass; an oil cooler disposed in said duct so that air may pass therethrough, said cooler being connected in said oil circulating system so as to cool hot oil therein; means for controlling the flow of air through said duct in accordance with the temperature of the oil which passes through said cooler whereby the temperature of the oil leaving the cooler may be regulated; a cooling agent radiator disposed in said duct so that air may pass therethrough, said radiator being connected in said cooling agent circulating system so as to cool heated cooling agent therein, said radiator being of excess capacity so as to cool said agent to a subnormal temperature; and bypass means connecting the inlet and the outlet of said radiator for bypassing a portion of the heated agent around said radiator, said bypass means having a thermostat valve for proportioning the flow of said agent through said radiator and through said bypass so as to produce in said cooling agent circulating system a stream of agent of substantially normal temperature.

7. In a cooling system for an internal combustion engine having an oil circulating system and a cooling agent circulating system, the combination of: a duct through which a flow of cooling air may pass; an oil cooler disposed in said duct so that air may pass therethrough, said cooler being connected in said oil circulating system so as to cool hot oil therein; means for controlling the flow of air through said duct in accordance with the temperature of the oil which passes through said cooler whereby the temperature of the oil leaving the cooler may be regulated; a cooling agent radiator disposed in said duct so that air may pass therethrough, said radiator being connected in said cooling agent circulating system so as to cool heated cooling agent therein, said radiator being of excess capacity so as to cool said agent to a subnormal temperature; and bypass means connected so as to bypass part of the heated agent around at least a portion of said radiator, said bypass means having a thermostat valve for proportioning the flow of said agent through said radiator and through said bypass so as to produce in said cooling agent circulating system a stream of agent of substantially normal temperature.

8. In a cooling system for an internal combustion engine having an oil circulating system and a cooling agent circulating system, the combination of: a duct through which a flow of cooling air may pass; an oil cooler disposed in said duct so that air may pass therethrough, said cooler being connected in said oil circulating system so as to cool hot oil therein; means for controlling the flow of air through said duct in accordance with the temperature of the oil which passes through said cooler whereby the temperature of the oil leaving the cooler may be regulated; a cooling agent radiator disposed in said duct so that air may pass therethrough, said radiator being connected in said cooling agent circulating system so as to cool heated cooling agent therein, said radiator being of excess capacity so as to cool said agent to a subnormal temperature; and thermostatic means for controlling the flow of agent through said radiator, so as to produce in said cooling agent circulating system a stream of agent of substantially normal temperature.

GEORGE HERBERT GILL.

---

CERTIFICATE OF CORRECTION.

Patent No. 2,376,683.

May 22, 1945.

GEORGE HERBERT GILL.

It is hereby certified that error appears in the printed specification of the above numbered patent requiring correction as follows: Page 3, first column, line 52, claim 2, strike out the words "cooling agent" and insert instead --oil--; and that the said Letters Patent should be read with this correction therein that the same may conform to the record of the case in the Patent Office.

Signed and sealed this 11th day of September, A. D. 1945.

Leslie Frazer (Seal)

First Assistant Commissioner of Patents.

and through said bypass so as to produce in said cooling agent circulating system a stream of agent of substantially normal temperature.

7. In a cooling system for an internal combustion engine having an oil circulating system and a cooling agent circulating system, the combination of: a duct through which a flow of cooling air may pass; an oil cooler disposed in said duct so that air may pass therethrough, said cooler being connected in said oil circulating system so as to cool hot oil therein; means for controlling the flow of air through said duct in accordance with the temperature of the oil which passes through said cooler whereby the temperature of the oil leaving the cooler may be regulated; a cooling agent radiator disposed in said duct so that air may pass therethrough, said radiator being connected in said cooling agent circulating system so as to cool heated cooling agent therein, said radiator being of excess capacity so as to cool said agent to a subnormal temperature; and bypass means connected so as to bypass part of the heated agent around at least a portion of said radiator, said bypass means having a thermostat valve for proportioning the flow of said agent through said radiator and through said bypass so as to produce in said cooling agent circulating system a stream of agent of substantially normal temperature.

8. In a cooling system for an internal combustion engine having an oil circulating system and a cooling agent circulating system, the combination of: a duct through which a flow of cooling air may pass; an oil cooler disposed in said duct so that air may pass therethrough, said cooler being connected in said oil circulating system so as to cool hot oil therein; means for controlling the flow of air through said duct in accordance with the temperature of the oil which passes through said cooler whereby the temperature of the oil leaving the cooler may be regulated; a cooling agent radiator disposed in said duct so that air may pass therethrough, said radiator being connected in said cooling agent circulating system so as to cool heated cooling agent therein, said radiator being of excess capacity so as to cool said agent to a subnormal temperature; and thermostatic means for controlling the flow of agent through said radiator, so as to produce in said cooling agent circulating system a stream of agent of substantially normal temperature.

GEORGE HERBERT GILL.

---

CERTIFICATE OF CORRECTION.

Patent No. 2,376,683. May 22, 1945.

GEORGE HERBERT GILL.

It is hereby certified that error appears in the printed specification of the above numbered patent requiring correction as follows: Page 3, first column, line 52, claim 2, strike out the words "cooling agent" and insert instead --oil--; and that the said Letters Patent should be read with this correction therein that the same may conform to the record of the case in the Patent Office.

Signed and sealed this 11th day of September, A. D. 1945.

Leslie Frazer (Seal) First Assistant Commissioner of Patents.